United States Patent
Elmoujarkach et al.

(10) Patent No.: US 10,941,274 B1
(45) Date of Patent: Mar. 9, 2021

(54) NANOPARTICLE-INFUSED ABS FILAMENT FOR 3D-PRINTED MATERIALS AND USES FOR NEUTRON DETECTION AND DISCRIMINATION

(71) Applicant: King Abdulaziz University, Jeddah (SA)

(72) Inventors: Ezzat Elmoujarkach, Jeddah (SA); Fuad AlNadwi, Jeddah (SA); Essam Banoqitah, Jeddah (SA); Abdulsalam Alhawsawi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/009,309

(22) Filed: Sep. 1, 2020

(51) Int. Cl.
| | |
|---|---|
| *G01T 1/02* | (2006.01) |
| *C08K 3/08* | (2006.01) |
| *G01T 3/06* | (2006.01) |
| *G01T 1/20* | (2006.01) |
| *B33Y 70/10* | (2020.01) |
| *B33Y 50/02* | (2015.01) |
| *B29K 505/00* | (2006.01) |
| *B33Y 10/00* | (2015.01) |
| *B29C 64/118* | (2017.01) |
| *B29K 55/02* | (2006.01) |

(52) U.S. Cl.
CPC .............. *C08K 3/08* (2013.01); *B33Y 50/02* (2014.12); *B33Y 70/10* (2020.01); *G01T 1/20* (2013.01); *G01T 3/06* (2013.01); *B29C 64/118* (2017.08); *B29K 2055/02* (2013.01); *B29K 2505/00* (2013.01); *B33Y 10/00* (2014.12); *C08K 2003/0831* (2013.01)

(58) Field of Classification Search
CPC .... C08K 3/08; C08K 2003/0831; G01T 3/06; G01T 1/20; B33Y 50/02; B33Y 70/10; B33Y 10/00; B29K 2055/02; B29K 2505/00; B29C 64/118
See application file for complete search history.

(56) References Cited

U.S. PATENT DOCUMENTS

| | | | |
|---|---|---|---|
| 4,259,280 A * | 3/1981 | Ambardanishvili | ...... G01T 3/00 250/473.1 |
| 4,744,922 A * | 5/1988 | Blakely | ................. C04B 35/573 252/478 |
| 6,166,390 A | 12/2000 | Quapp et al. | |
| 6,284,503 B1 | 9/2001 | Caldwell et al. | |
| 7,115,872 B2 | 10/2006 | Bordynuik | |

(Continued)

FOREIGN PATENT DOCUMENTS

| | | |
|---|---|---|
| WO | 2015/077536 A1 | 5/2015 |
| WO | 2019/200386 A1 | 10/2019 |

*Primary Examiner* — Kiho Kim
(74) *Attorney, Agent, or Firm* — W & C IP

(57) ABSTRACT

Neutron radiation can be attenuated by a material comprising acrylonitrile butadiene styrene (ABS) filament infused with gadolinium, boron, gold, and/or cadmium. The metal-infused filaments are 3D-printed to form a sleeve or cover for gamma and/or alpha radiation detectors to shield, absorb and allow detection of neutrons that are converted to gamma and or alpha radiation. The materials can also allow discrimination between neutron and gamma and/or alpha radiation in a mixed radiation field. Boron-infused filaments also provide neutron shielding and can be used in the manufacture of water equivalent phantoms.

13 Claims, 7 Drawing Sheets

(56) References Cited

U.S. PATENT DOCUMENTS

| | | | |
|---|---|---|---|
| 10,059,021 B2 | 8/2018 | Deng et al. | |
| 10,124,485 B2 | 11/2018 | Van Engelhoven et al. | |
| 10,391,627 B2 | 8/2019 | Van Engelhoven et al. | |
| 2009/0050816 A1* | 2/2009 | Amano | G01T 1/249 |
| | | | 250/370.09 |
| 2013/0045382 A1 | 2/2013 | Horinek et al. | |
| 2016/0289468 A1 | 10/2016 | Turner | |
| 2016/0291196 A1* | 10/2016 | De Vita | G01V 5/0091 |
| 2017/0130034 A1 | 5/2017 | Hwang et al. | |
| 2018/0298215 A1 | 10/2018 | Andersen et al. | |
| 2018/0346708 A1* | 12/2018 | Malet Murillo | C08F 212/10 |
| 2019/0005184 A1* | 1/2019 | Courtin | B64F 5/60 |
| 2020/0223057 A1 | 7/2020 | Van Engelhoven et al. | |

\* cited by examiner

NANOPARTICLE-INFUSED ABS FILAMENT FOR 3D-PRINTED MATERIALS AND USES FOR NEUTRON DETECTION AND DISCRIMINATION

BACKGROUND OF THE INVENTION

Field of the Invention

The invention generally relates to a nanoparticle-infused filament for a 3D-printed material and methods for use of the material to detect thermal neutron radiation. The invention further relates to methods of using the 3D-printed material for discrimination of radionuclides in a mixed radiation field, including thermal neutron radiation.

Background 3D printing has been used in many fields in recent years, including medicine, manufacturing, aeronautical applications, robotics, and much more. It was also used in a few studies for radiation shielding from x-ray machines and CT studies. A study to compare the main types of 3D printers for 3D printing phantoms has also been performed (Bieniosek et al. 2013, *IEEE Nucl Sci Symp Conf Rec* doi.org/10.1109/NSSMIC.2013.6829187), in which the authors printed X-ray and positron emission tomography (PET) phantoms using ProJet HD3500, which print plastic with a resolution of 750×750×890 (x-y-z) dots-per-inch. Others have used a Z Corp 3D printer (Z Corporation; Rock Hill S.C., US), which uses a mixed powder that has an attenuation coefficient close to the water and equivalent to the tissue (Yoo et al., Proceedings of *IEEE Internat Symp Biomed Imag*, 2011; Hazelaar et al. 2018, *Med Phys* 45:92-100)

Neutrons interact with matter by inelastic and elastic collisions. During elastic collisions, the neutron interacts with an atomic nucleus, resulting in loss of energy of the incident neutron. Elastic scattering leads to the loss of kinetic energy (slowing down) of neutrons by billiard ball-type collisions. This process leads to the generation of highly energetic recoil nuclei, which lose energy by excitation and ionization of the surrounding material. The recoil process is governed by the laws of conservation of momentum and energy. Due to the small size of the nucleus in relation to the atom, neutrons have a low probability of interaction. That probability also is affected by the material, which dictates the size of the atom. Up to half of the kinetic energy of a neutron is lost on collision with a hydrogen nucleus since the masses are almost equal. Thus, materials with high hydrogen content, such as water or paraffin wax, are effective for neutron shielding. This process of colliding/interacting is referred to as thermalizing or slowing down of neutrons. The fast neutron energy drops to the slow neutron energy range and then drops further to a thermal neutron energy at 0.025 eV, at which point the thermal neutrons are captured by the nuclei as a result of the collision/interaction process.

3D printed objects can act as a shield to protect from radiation when they are printed in specific dimensions and shape for a special application using a select type of filaments infused with an element having a high atomic number, such as tungsten and bismuth. For example, Gmass is one of the companies that offer two types of materials that can be used for shielding. Both are ABS-based; one is infused with bismuth, while the other is infused with tungsten. The material type and thickness are considered when shielding against gamma radiation. The higher material density requires less thickness to maintain the dose below the necessary limit. The most common shield for gamma is lead for its high atomic number and high density (11.34 g/cm$^3$). WO2015/077536 describes an ABS filament for 3D printing which includes heavy metal nanoparticles therein (e.g., tungsten or bismuth). But the printed material with tungsten or bismuth provides for radiation shielding only.

Thus, there is a need for methods and devices for detecting neutron radiation and radionuclide sources from nuclear materials. These can be used in the nuclear industry or research but could also be useful for detecting hidden and/or smuggled nuclear materials at border crossings or customs ports. There is also a need for surveillance and detection of highly dangerous nuclear devices that might be installed as acts of terrorism. Identification of radiation sources or types within a mixed field is also needed for all these applications since conventional gamma and alpha detectors are blind to neutron particles.

SUMMARY OF THE INVENTION

The invention is a 3D-printed material comprising an acrylonitrile butadiene styrene (ABS) filament infused with at least one metal selected from the group consisting of gadolinium, boron, gold and cadmium, wherein the ABS filament so infused is able to interact with thermal neutrons. When neutron radiation is passes through the 3D-printed material of the invention, the energy of the neutron radiation is decreased and converted to gamma radiation. The resultant gamma radiation may be detected with any conventional gamma and/or alpha radiation detector. Thus, neutron radiation passing through the 3D-printed material is slowed to an energy that can be capture and converted to gamma and/or alpha radiation which are detectable particles by a gamma and/or alpha radiation detector.

In one embodiment, the ABS filament is infused with a single metal type selected from group of gadolinium, boron, gold, and cadmium. In another embodiment, the ABS filament is infused with at least two metals selected from the group of gadolinium, boron, gold, and cadmium. The amount of metal infused in the ABS filament is typically at a concentration in the range of 0.1 to 10 w/w.

Selection of the metal varies according the application of interest. In one embodiment, the metal is gadolinium, and the 3D-printed material made with gadolinium-infused ABS filament can be used to discriminate neutrons and identify the presence of neutrons either in a pure neutron field or within a gamma/neutron mixed field of radiation. In one embodiment, the invention is a two cm-thick sleeve 3D-printed with gadolinium-infused ABS and placed around a gamma detector, where the combination is able to detect and absorb all incident thermal neutrons.

In another embodiment, the metal is boron and the 3D-printed material made with boron-infused ABS filament can be used for shielding applications. For example, a 3D-printed material having a thickness of approximately 1.5 cm reduces the dose from a thermal neutron source to half of the starting energy. Also, a 3D-printed material of boron-infused ABS filament can be used for water-equivalent dosimetry phantoms for thermal neutrons.

In another embodiment, the metal is gold and the 3D printed material made with gold-infused ABS filament is used for overall radiation shielding when the 3D printed object needs to be less than 1 cm in thickness. This type of filament can also be used as neutron spectrometry by applying prompt gamma activation analysis.

In another embodiment, the metal is cadmium and the 3D printed material made with cadmium-infused ABS filament is used to reduce the presence of neutrons while not introducing new radiation or blocking the existing gamma in the field.

A key advantage of the technique of 3D-printing, the material may be custom-designed and fabricated to fit any shape or conformation needed for any particular application, providing the benefit of a secure fit that contributes to reproducible and reliable detection of neutrons. Thus, one embodiment of the invention is a method of fabricating a 3D-printed material comprising a filament able to interact with thermal neutrons, wherein energy of neutron radiation is decreased and converted to gamma and/or alpha radiation, comprising the steps of providing an acrylonitrile butadiene styrene (ABS) filament infused with at least one metal selected from the group consisting of gadolinium, boron, gold and cadmium;

determining a desired shape or configuration to be produced;

programming a 3D-printer to print the ABS filament in the desired shape or configuration. In one embodiment, the method of the invention provides a 3D-printed material in the form of a sleeve or overlay in a shape suitable for application on, over or around a gamma radiation detector. In another embodiment, the 3D-printed material is placed around objects that are far away from the detector but near the check points where a person carrying a source might pass by in ports, airports or any sensitive place where it is desirable to protect against the use of radioactive device exposure. The printed object can cover handles, partition, and any other part or object around the area while the detector is placed somewhere away (for instance, near security cameras) where the gamma radiation still is able to reach the detector.

Yet another embodiment of the invention is a method of detecting or measuring neutron radiation. The method uses the 3D-printed material of the invention to slow or thermalize neutron energy to be captured and converted to gamma and/or alpha radiation, which can be detected using a gamma and/or alpha radiation detector, wherein the 3D-printed material comprises an acrylonitrile butadiene styrene (ABS) filament infused with at least one metal selected from the group consisting of gadolinium, boron, gold and cadmium; comprising the steps of fabricating the 3D-printed material in a shape or configuration appropriate for detecting neutron radiation, applying the 3D-printed material to a device configured for detecting gamma and/or alpha radiation, and operating the device according to a suitable protocol for detecting gamma and/or alpha radiation with the detector of interest.

The metal for infusion into the ABS is selected on the basis of its suitability for slowing the neutron energy to a convert it to radiation sources that are compatible with the detector of interest, and for discriminating and identifying radionuclides in a mixed radiation field. For some applications, the ABS filament may be infused with two or more metals selected from the group of gold, cadmium, gadolinium and boron. Adding two infused metals, for example gadolinium and cadmium, provides a multifunctional filament and 3D-printed material, so that if the source had high activity, less prompt gamma will be produced by the gadolinium as some of the neutron will be absorbed in the cadmium. This is a critical point because a high number of prompt gamma rays can flood the detector and cause deadtime for the detection. Another application can be used with gold and cadmium. The filament with only ABS and Au can be used to detect total neutrons (fast and thermal neutrons) while adding cadmium to the filament will cause the thermal neutrons to absorbed by cadmium while only fast neutrons will be absorbed by the gold. This will be extremely useful with prompt gamma detection and activation analysis.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 6B and 6D show the same detector, face up/down. The entry window for the detector is the gray area on the left in the bottom picture. Not drawn to scale.

FIGS. 7A and 7B show two views of CAD drawings of the sleeve. FIG. 7C shows a top view of the radiation detection device and FIG. 7D shows an end view, comprising the window through which radiation enters when the device is in use.

DETAILED DESCRIPTION

Figure 1:
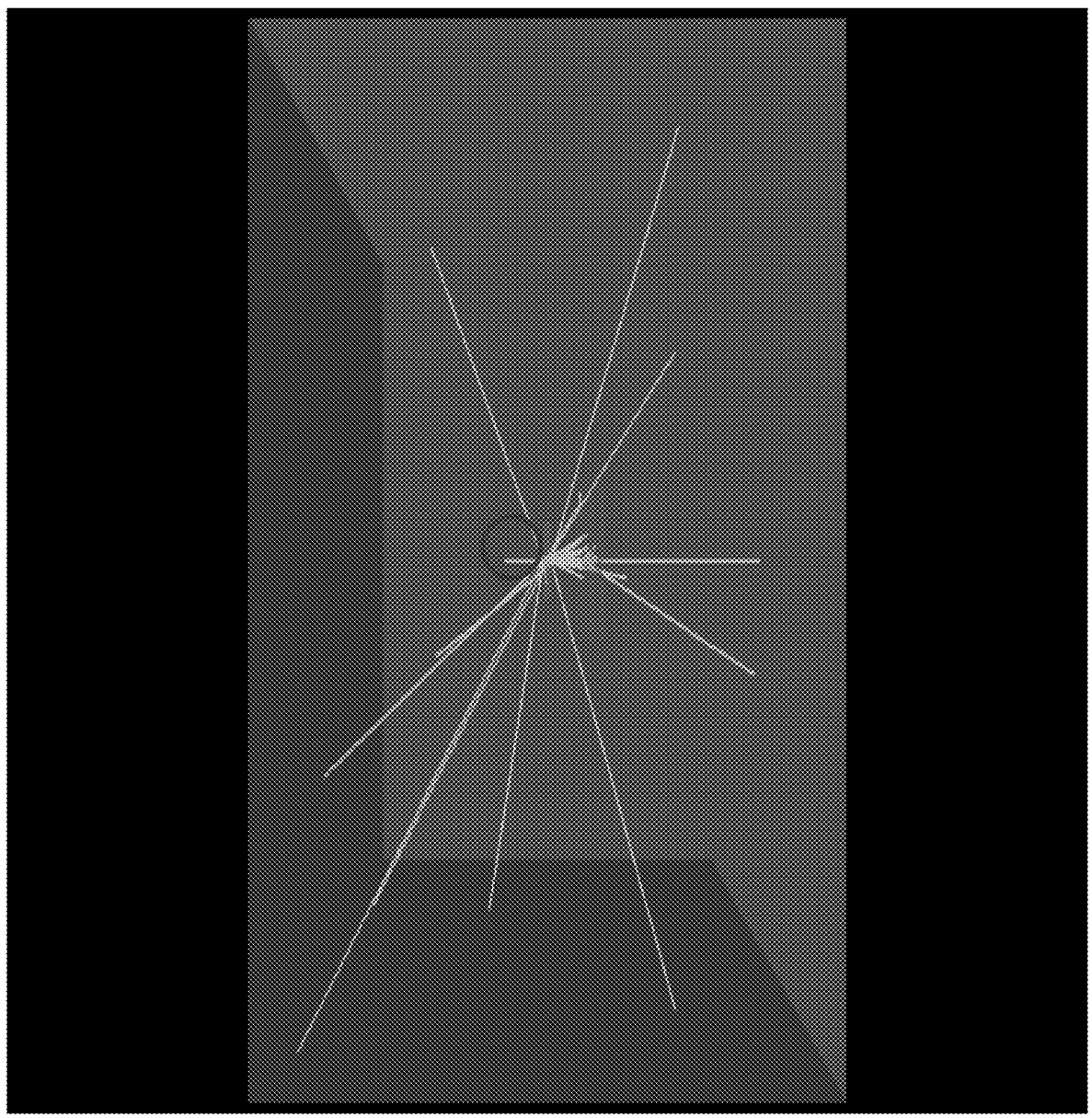
FIG. 1 shows a simple set-up to demonstrate absorbance and shielding from a thermal neutron source having an energy of 0.025 eV. The red circle indicates the placement of the thermal neutron source, and green lines represent theoretical paths of neutron radiation emitted from the source. The red box indicates the sample and the blue box indicates the detector. The output is an estimate of the total absorbed dose and of the neutron absorbed dose.

The following descriptions and examples illustrate some exemplary embodiments of the disclosed invention in detail. Those of the skill in the art will recognize that there are numerous variations and modifications of this invention that are encompassed by its scope. Accordingly, the description of a certain exemplary embodiment should not be deemed to limit the scope of the present invention.

The invention is a 3D-printed material designed to slow fast neutron radiation so that it can be converted and then detected using conventional gamma radiation detection devices. The material comprises an acrylonitrile butadiene styrene (ABS) filament, which is a well-known and widely available filament for various 3D-printing applications. When the ABS filament is infused with nanoparticles of an element having a high atomic number, the filament with nanoparticles interacts with neutrons to slow or thermalize them to an energy where the neutrons can be captured by the filament, releasing secondary radiation (gamma-rays, alpha particles, etc.) that are detectable with a gamma radiation detector. The ABS filament of the invention is infused with gadolinium, boron, gold and/or cadmium to meet the needs for various applications. For example, gadolinium improves discrimination of neutrons in a mixed field of radiation sources, including a gamma neutron mixed field. Furthermore, attaching a two cm-thick sleeve 3D-printed with gadolinium-infused ABS around a detector would absorb all the incident thermal neutrons. A boron-infused ABS 3D-printed material can be used for shielding applications, since a 3D-printed material having a thickness of approximately 1.5 cm reduces the dose from a thermal neutron source to half. Also, a 3D-printed material of boron-infused ABS filament can be used for water-equivalent dosimetry phantoms for thermal neutrons. In nuclear reactors, water is used to thermalize neutrons. Other materials that are good absorbers for neutrons are gadolinium, boron and cadmium. Nevertheless, it should be noted that when thermal neutrons interact with gadolinium, it will result in prompt gamma radiation, while alpha radiation will be emitted when interacting with boron. Since alpha particles cannot be detected by a gamma detector, the use of other metals to produce gamma rays is preferred when using a gamma detector. This effect is not observed with cadmium. In another embodiment, the metal is cadmium and the 3D printed material made with cadmium-infused ABS filament is used when a user needs to reduce the presence of neutrons while avoiding introducing new radiation or blocking the existing gamma in the field.

Gold is also a good absorber for both fast and thermal neutrons, which emits both prompt and delayed gamma when absorbing neutrons. Thus, gold-infused ABS filament can be used for detection and/or discrimination of neutrons in a mixed field for both instant detection or delayed gamma analysis for neutron source identification and analysis. In another embodiment, the metal is gold and the 3D printed material made with gold-infused ABS filament is used for overall radiation shielding when the 3D printed object is preferred to be less than 1 cm in thickness.

As used here, the terms "sleeve", "covering" and "overlay" are used interchangeable to refer to the shape or form of the 3D-printed material. These shapes are not limiting, since a key advantage of the invention is the use of 3D-printing technology that allows fabrication of material in any desired shape. The shape of the material is guided by the shape of the detection device to be covered. While most of these are like to be square, rectangular, or columnar, other unusual shapes are contemplated. Thus, the sleeve may be custom-designed and fabricated to fit any shape or conformation needed for any desired application, thus providing the benefit of a secure fit that contributes to reproducible and reliable detection of neutrons.

In one embodiment, the invention is a method of fabricating a 3D-printed material comprising a filament able to interact with thermal neutrons, wherein energy of neutron radiation is decreased and converted to gamma radiation, comprising the steps of providing an acrylonitrile butadiene styrene (ABS) filament infused with at least one metal selected from the group consisting of gadolinium, boron, gold and cadmium;

determining a desired shape or configuration to be produced;

programming a 3D-printer to print the ABS filament in the desired shape or configuration. In one embodiment, the invention is a 3D-printed material in the form of a sleeve or covering in a shape suitable for application on, over or around a gamma and/or alpha radiation detector. The size or depth of a sleeve or covering may vary so that the contact between the sleeve and the device is adequate to ensure the sleeve stays in place. In an exemplary embodiment, the depth of the cavity in the sleeve or covering is 10 mm, but this is not limiting and may be increased or decreased as needed to ensure an adequately tight fit over the device. Thus, the depth may range from a few mm, 5 mm, 10 mm, 20 mm, 50 mm, 70 mm to 100 mm or more. The thickness of the walls may also vary from a few mm to 5 mm, 10 mm, 20 mm, 25 mm to 50 mm or more. However, a key advantage to the invention is that a minimum of material is used, thus increasing the safety for the user, and the resolution of discrimination between neutron radiation and gamma or alpha radiation.

In another embodiment, the invention is a method of detecting or measuring neutron radiation. The method uses the 3D-printed material of the invention to slow or thermalize neutron energy to range that is comparable to gamma radiation, wherein the 3D-printed material comprises an acrylonitrile butadiene styrene (ABS) filament infused with at least one metal selected from the group consisting of gadolinium, boron, gold and cadmium; comprising the steps of fabricating the 3D-printed material in a shape or configuration appropriate for detecting neutron radiation, applying the 3D-printed material to a device configured for detecting gamma radiation, and operating the device according to a suitable protocol for detecting gamma radiation.

The metal for infusion into the ABS is selected according to its suitability for discriminating and identifying radionuclides in a mixed radiation field. For some applications, the ABS filament may be infused with two or more metals selected from the group of gold, cadmium, gadolinium, and boron. Adding two infused metals, for example gadolinium and cadmium, provides a multifunctional filament and 3D-printed material, so that if the source had high activity, less prompt gamma will be produced by the gadolinium as some of the neutron will be absorbed in the cadmium. This is a critical point because a high number of prompt gamma rays can flood the detector and cause deadtime for the detection. Another application can be used with gold and cadmium. The filament with only ABS and Au can be used to detect total neutrons (fast and thermal neutrons) while adding cadmium to the filament will cause the thermal neutrons to absorbed by cadmium while only fast neutrons will be absorbed by the gold. This will be extremely useful with prompt gamma detection and activation analysis.

In one embodiment of the invention, the metal-infused filament is a 3D-printed sleeve for a gamma radiation detector. In another embodiment, the invention is a cover for a detector that discriminates neutrons in a mixed radiation field to identify radionuclide sources. The 3D-printed customizable sleeve or overlay of the invention also protect areas from excess or stray neutron radiation. This can be beneficial for any equipment that was not specifically designed for neutron radiation exposure but is being "converted" or adapted for this purpose with the 3D-printed materials of the invention. In another embodiment, the invention is a method for using the 3D-printed material to detect and/or discriminated neutrons within a mixed field of radiation.

The metal-infused ABS filament of the invention interacts with neutrons that are directed intentionally or unintentionally toward the 3D-printed material, which is deployed so that the neutrons pass through the 3D-printed material before entering the window through which radiation is detected by the radiation detection device. When neutron radiation passes through the 3D-printed material of the invention, the energy of the neutron radiation is decreased and converted to gamma-ray and or alpha particle radiation, and the resultant radiation may be detected with any conventional gamma/alpha radiation detector. In one embodiment, the 3D-printed material is a sleeve that fits around a gamma radiation detector. Thus, neutron radiation passing through the sleeve is slowed to an energy that can be converted to gamma-rays and or alpha particles that can be detected within the range of detection capability of the sleeved gamma radiation detector. In another embodiment, the 3D-printed material is a sleeve or covering that fits over or around a gamma/alpha radiation detector, and the radiation passing through the sleeve or covering is detected as either gamma, alpha, or both types of radiation.

Selection of the metal type varies according the application of interest. In one embodiment, the metal is gadolinium, and the 3D printed material made with gadolinium-infused ABS filament is used to discriminate neutrons and identify whether the radionuclide source is neutron radiation or gamma radiation when detecting a gamma/neutron mixed field. Gold-infused filaments in 3D-printed materials can also be used to identify the neutron source since using gold for prompt gamma activation analysis where the activity of the gamma emitted from the gold can allow determination of the energy and activity of the neutron source] In one embodiment, the invention is a two cm-thick sleeve 3D-printed with gadolinium-infused ABS and placed around a detector, wherein the detector is able to detect and absorb all incident thermal neutrons.

In one embodiment, the ABS filament is infused with a single metal type selected from group of gadolinium, boron, gold, and cadmium. In another embodiment, the ABS filament is infused with at least two metals selected from the group of gadolinium, boron, gold, and cadmium. The amount of each metal infused in the ABS filament is typically at a concentration in the range of 0.1 to 10 w/w. Use of two metal types adds functionality to the sleeve by provided more than one application for the sleeve.

WO2019/200386 is directed to neutron shielding and absorption materials and particularly to devices uses for absorbing thermal neutrons from an environment and specifically identifies boron, gadolinium and cadmium as exemplary elements for absorbing compounds in 3D printing processes that do not use ABS. However, the invention uses pure gadolinium, while WO2019/200386 uses a gadolinium oxide. In exemplary embodiments of the invention, the amount of gadolinium used was between 0.1% and 10% (depending on the metal used) which is 0.01 to 1 of the atomic fraction, while WO2019/200386 teaches the use of 3-27% weight of $GdO_3$. This difference is important since the more material interacting with neutrons results in more radiation the user will receive and more contamination of the object, as shown in FIG. 6 of WO2019/200386. Having small amount of activation material is a key technical advantage that enhances safety for the use, while increasing the ability to discriminate between neutron radiation and gamma radiation.

In another embodiment, the metal is boron and the 3D printed material made with boron-infused ABS filament is used for shielding application. For example, a 3D-printed material having a thickness of approximately 1.5 cm reduces the dose from a thermal neutron source to half. Also, as the boron-infused ABS filament at a thickness of approximately 4 cm had absorption results similar to that of water, a 3D-printed material of boron-infused ABS filament can be used for water-equivalent dosimetry phantoms for thermal neutrons. In the case of alpha radiation, neutron interaction with boron results in alpha particles that travel less than few millimeters in air and a few micrometers in a medium. The amount of boron used is less than 0.6% of the atomic fraction which is less than 0.1% of the weight. This is in contrast to Addbor N25, a proprietary filament of boron carbide within a co-polyamide matrix for 3D-printing (Additive Composite, Sweden), which uses 25% weight boron carbide to produce filaments used for other application for research and in the nuclear industry. This difference is important since more material interacting with neutrons increases the amount of radiation received results in more contamination of an object, such as the 3D-printed material of the invention. The metal-infused filament is an activation material and having a smaller amount of activation material is critical for detecting the neutron source while keeping activation of the material at a minimum for a longer length of time. The reduced activation is both a technical element of the invention, as well as a safety feature for a user.

US2018/0298215 discloses 3D-printing materials and methods using a suspension with a ceramic material and a fatty acid. Polymers including ABS and metallic materials may be included in the suspension of printing material, including gold, cadmium, and gadolinium, but the amounts of metals are much higher than those used in the filaments of the invention. In embodiments of the invention, the amount of metal used was less than 0.6% of the atomic fraction, equivalent to 0.1% to 10% (depending on the metal used) of the weight, while the prior art of US2018/0298215 uses 50-95% weight of the metallic element.

Before exemplary embodiments of the present invention are described in greater detail, it is to be understood that this invention is not limited to any of the particular embodiments described herein and may vary. It is also to be understood that the terminology used herein is for the purpose of describing particular embodiments only, and is not intended to be limiting, since the scope of the present invention will be limited only by the appended claims.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

EXAMPLES

The following Examples provide exemplary designs and methods for fabricating and using microgrippers of the invention. These Examples describe materials and methods for using embodiments illustrated in FIGS. 1-7. Additional details can be found in the section entitled "Brief Description of the Drawings".

The following Examples of the invention use a simulation toolkit to guide fabrication and establish limitations of a new type of 3D filament that can be used for shielding, detection, discrimination, and other applications of thermal neutrons.

Materials and Methods

3D-Printing Technology 3D-printing is a computer-controlled process that joins or solidifies materials together (e.g., powder or liquid particles fused together) as one or multiple three-dimensional objects. There are many different technologies that make 3D printing possible. Fused deposition modeling (FDM) methodology is the most commonly used practice for acquiring live 3D objects, based on the number of people using this methodology (Kate Cummins 2010).

For the FDM type of printers, there are plenty of materials that can be used as printing material. The main constituent of any 3D printing FDM filament is thermoplastic. Recently, some materials have been developed which contain metals fused with a proper thermoplastic (e.g., polylactide fused with copper). A pure polylactide printing material, which has a density of 1.24 g/cm$^3$, was used in the following Examples of the invention. In these Examples, the material is doped with different types of nanoparticles characterized by neutron high absorption probability. Nanoparticles used in the Examples are boron, gold, gadolinium, and cadmium.

Simulation

Monte Carlo simulations were carried out with GATE (Geant4 Application for Tomographic Emission) toolkit, which is a specialized Monte Carlo simulation toolkit used for simulating the interaction between radiation and matter. GATE was used due to its highly accurate results and easy to use commands. GATE has been used in radiation studies in many fields, including dosimetry (Sarrut et al. 2014), imaging (Jan et al. 2011), radiation therapy (Sarrut et al. 2014), materials studies (Ozyurt et al. 2018) and other applications.

A simple setup was used, as shown in FIG. 1, with the source placed 10 cm away from the detector. The sample that will be studied for shielding is placed at the center between the detector and the source. The shielding sample thickness will be changing from 0.25 cm to 5 cm with a step of 0.25 cm. The doping nanoparticles of the material of the sample will be changed, trying different material compositions to see which yield the best results. The source that will be used in the simulation will be a thermal neutron source with an energy of 0.025 eV. The simulation output will estimate the total absorbed dose and the neutron absorbed dose.

Materials

In order to have an accurate representation of the filament in simulation, an ABS sample was scanned using Field Emission Scanning Electron Microscope (JEOL JSM-7600F) to determine the chemical composition of the filament. To have a sense of how much doping material needs to be used, the GMASS™ ABS infused with bismuth and tungsten were also scanned (ToyBuilder Labs; Pasadena Calif., US). The ABS-bismuth has a density of 2.4 cm$^3$/g while the Tungsten has a density of 4 cm$^3$/g that 1 cm of it is equivalent to 2 mm of lead for gamma shielding. Table 1 below shows the obtained results from the scan. A careful look at the scan results shows no bismuth in the third sample. The scanner can detect up to 0.01% of concentration, thus bismuth is present in a minimal quantity. However, tungsten showed in the second sample at 0.6%. For our study, 0.6% of the required material will be doped with the first sample of ABS.

TABLE 1

The element fraction for each material

| Element | Material Fractions | | | |
|---|---|---|---|---|
| | PLA | W | Bi | ABS |
| C | 0.6302 | 0.9574 | 0.8692 | 0.7247 |
| O | 0.365 | 0.0326 | 0.1092 | 0.1532 |
| Al | — | 0.0007 | — | — |
| Ca | — | 0.0015 | — | — |
| Cr | — | 0.0015 | — | — |
| W | — | 0.0063 | — | — |

TABLE 1-continued

The element fraction for each material

| Element | Material Fractions PLA | W | Bi | ABS |
|---|---|---|---|---|
| Na | 0.0039 | — | 0.0023 | 0.0107 |
| Si | 0.0009 | — | — | 0.0007 |
| Cl | — | — | 0.0004 | — |
| Cu | — | — | 0.014 | 0.0098 |
| Zn | — | — | 0.0049 | — |
| N | — | — | — | 0.1009 |
| Total | 1 | 1 | 1 | 1 |

Example 1

Figure 2:
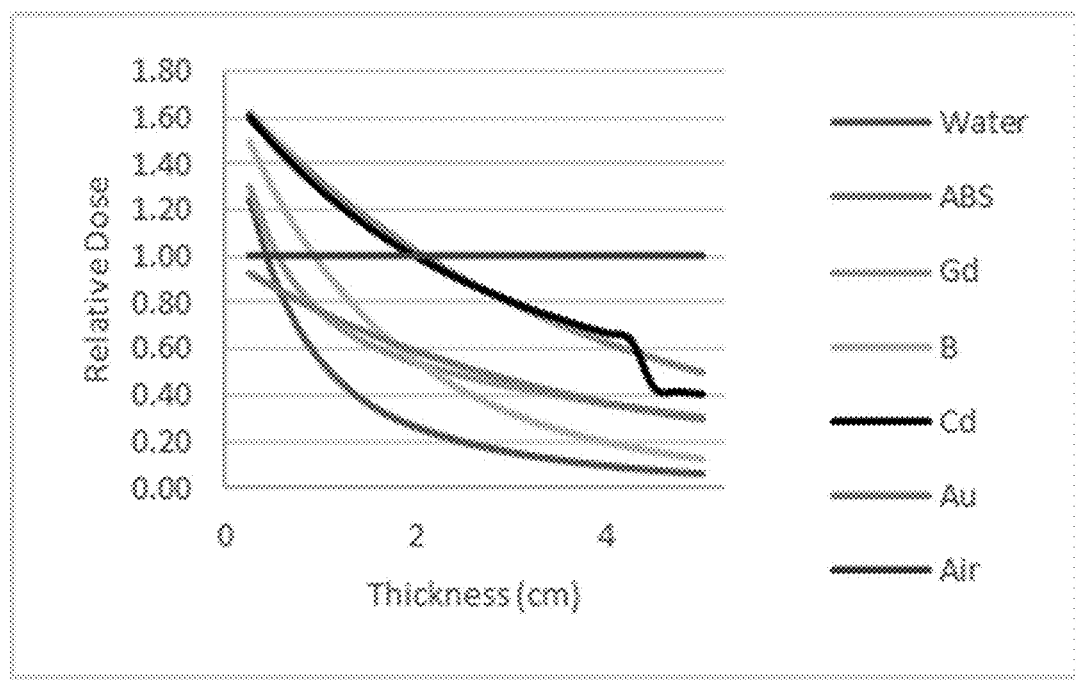
FIG. 2 shows the total relative dose for each type of absorption material using a thermal neutron source, with absorption materials consisting of: water, air, non-infused ABS, gold-infused ABS, boron-infused ABS, gadolinium-infused ABS and gold-infused ABS.

ABS filaments were infused with gadolinium, boron, cadmium, or gold nanoparticles during 3D printing. Control ABS filaments were also 3D-printed but without metal nanoparticles. FIG. 2 shows the total dose absorbed by the detector as a relative dose. Pure non-infused control ABS filaments are shown to be ineffective for neutron shielding. A thickness of less than 2 cm results in a higher dose (see Water and Air in FIG. 2) than when no shield is used.

It is noticeable that the best results are acquired when using water, as no prompt gamma is produced by the sample, since the alpha radiation emitted is absorbed before reaching the detector. Following water, the boron-infused ABS performed best overall. Cadmium-infused ABS shows a stable dose reduction following the ABS trend. The gadolinium-infused ABS sample increased the dose due to prompt gamma emission at low thickness, while the dose is reduced when increasing the thickness due to self-absorption or self-shielding. Gold-infused ABS samples showed the best results when using less than 1 cm. There was no initial increase in the dose for gold-infused ABS, as was the case with the other samples. However, after the 1 cm mark, the dose reduction for gold-infused ABS starts to be steady, resulting in similar results for gold-infused ABS and gadolinium-infused ABS.

Example 2

Table 2 shows the concentration for each sample tested in Examples 2 and 3 of the invention.

TABLE 2

The element fraction for the fabricated materials.

| Element | Material Fractions ABS | Gd | Boron | Cd | Au | Air |
|---|---|---|---|---|---|---|
| ABS | 1 | 0.9937 | 0.9937 | 0.9937 | 0.9937 | — |
| Gd | — | 0.0063 | — | — | — | — |
| Boron | — | — | 0.0063 | — | — | — |
| Cd | — | — | — | 0.0063 | — | — |
| Au | — | — | — | — | 0.0063 | — |

Figure 3:
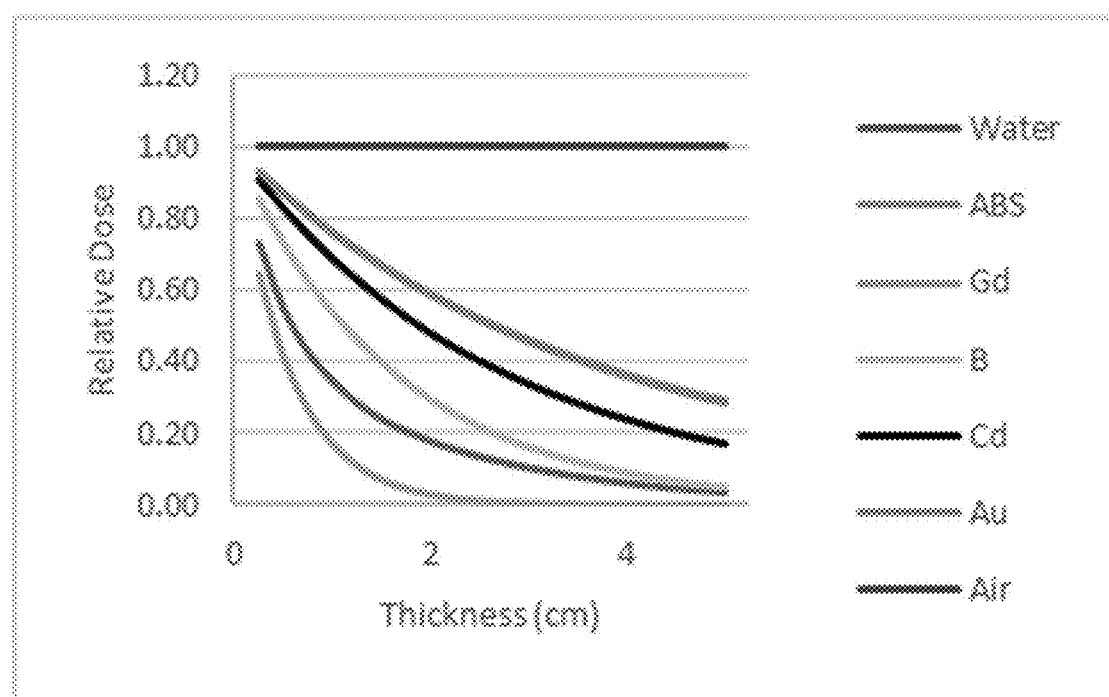
FIG. 3 shows the neutron relative dose for each type of absorption material using a thermal neutron source.

Looking closely at the neutron absorbed dose in FIG. 3, it is shown that in all cases, neutrons are absorbed in the sample. Almost all neutrons are absorbed in the gadolinium sample with a thickness of more than 2 cm. Boron showed the second-best results while being almost identical to the water sample when reaching 4 cm. Adding gold to the ABS does not seem to affect the neutron absorption where both the ABS and the fold nanoparticles follow the same trend. The use of cadmium did reduce the neutron dose better than pure ABS.

These results demonstrate that different compositions can be used for different applications. For example, a gadolinium-infused ABS 3D-printed material can be used to discriminate and identify radionuclide source of neutrons when detecting a gamma neutron mixed field. This is demonstrated by the efficient conversion of neutron radiation to gamma radiation, wherein the total dose was high but the neutron dose was low. This indicates that the neutrons were absorbed in the 3D printed material and a secondary radiation was emitted.

Furthermore, attaching a two cm-thick sleeve 3D-printed with gadolinium-infused ABS around a detector would absorb all the incident thermal neutrons. A boron-infused ABS 3D-printed material can be used for shielding applications, since a 3D-printed material having a thickness of approximately 1.5 cm reduces the dose from a thermal neutron source to half. Also, as the boron-infused ABS filament at a thickness of approximately 4 cm had absorption results similar to that of water, a 3D-printed material of boron-infused ABS filament can be used for water-equivalent dosimetry phantoms for thermal neutrons.

Example 3

Figure 4A:
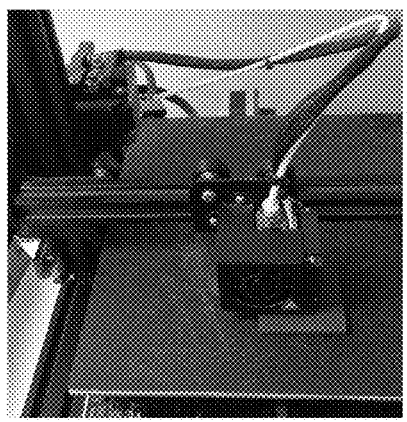
FIGS. 4A-4F show various views of two different printers and the steps that can be used to print the metal-infused ABS filaments into 3D-printed materials.
Figure 4B:
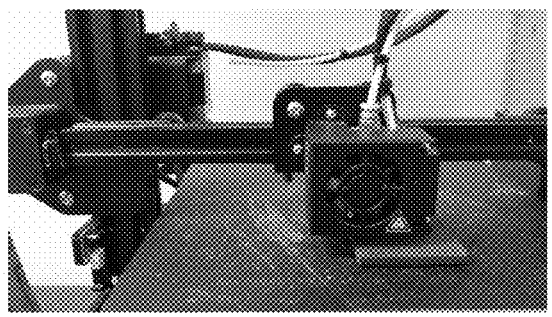
Figure 4C:
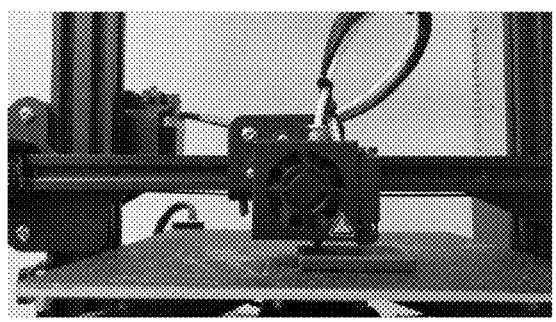
Figure 4D:
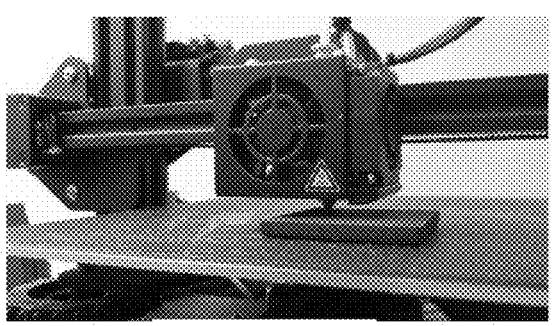
Figure 4E:
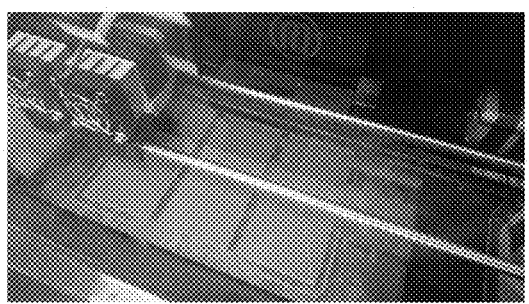
Figure 4F:

FIGS. 4A-4F show two models of fused deposition modeling (FDM) 3D-printers. FIGS. 4A-4D show a Creality 3D® printer (Creality; Shenzhen, China), and FIGS. 4E-4F show a Makerbot printer (MakerBot Industries, LLC; Brooklyn N.Y., USA).

FIG. 4A is an oblique view of a 3D printer that shows the box that contains the hot-end, cooling fans and the nozzle of the printer positioned over the bed, and FIG. 4B is a side view. The solid filament is fed to the hot-end through the white tubing. The filament is then melted and collected inside the hot-end before being pushed out or extruded through the nozzle. FIGS. 4C and 4D are a side view, wherein the printer nozzle is visible, and is nearly in contact with the bed onto which 3D-printing occurs. A metal-infused ABS filament is fed into the printer extruder where the filament is pushed to the hot-end then heated and melted and pushed towards the nozzle. In the nozzle the filament is collected in a liquid form having a temperature that is a little above melting point. As the melted filament exits the nozzle and touches the bed it becomes solid and the 3D sleeve is printed layer by layer.

FIG. 4E is an overhead view showing the MakerBot 3D printer, upon which six pieces of material are being printed. With this printer, the filament is also melted in a reservoir and pushed out through the nozzle. The extrusion and printing process are essentially the same as that of FIGS. 4A-4D. FIG. 4F is a side view of the printer with the work in progress.

Example 4

Figure 5A:
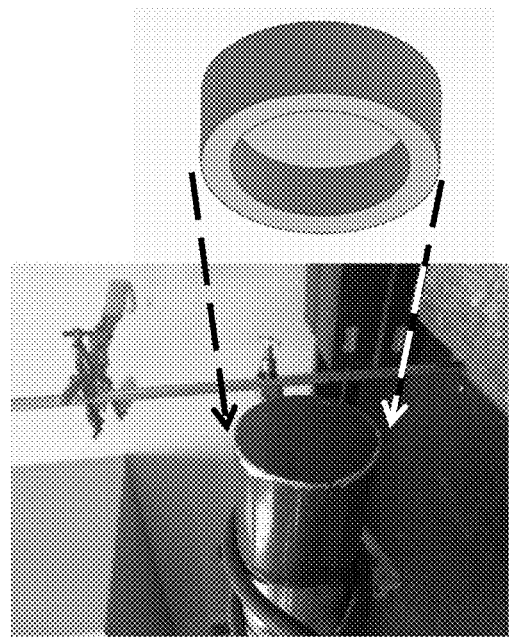
FIGS. 5A and 5B show two views of a CAD drawing of an exemplary sleeve or covering designed to fit over a sodium iodide (NaI) scintillation detector a device for detecting gamma radiation. Dotted arrow lines indicate the directional application of the sleeve onto the distal end of scintillation detector, thus covering the window of the scintillation detector. Not drawn to scale.
Figure 5B:
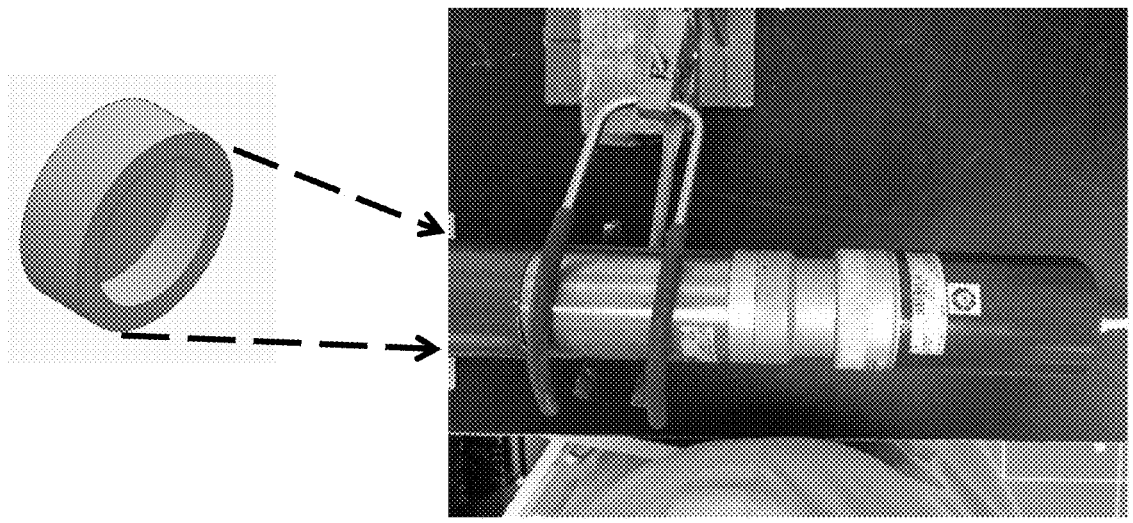
Figure 6A:
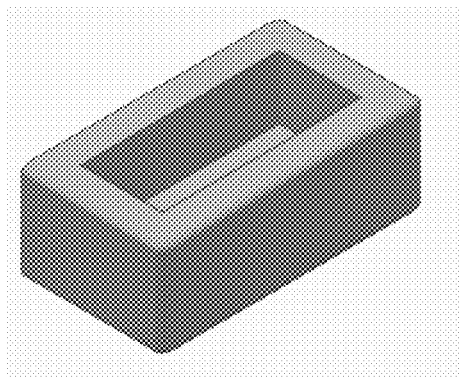
FIGS. 6A-6D show two views of a CAD drawing of an exemplary sleeve or covering, shown in 6A and 6C, designed to fit over a Geiger Counter (GC), that is used for gamma and/or alpha (when entry window is modified) radiation detection device, shown in 6B and 6D. When in use, the device is placed inside the sleeve so that the window for detection of radiation is covered.
Figure 6B:
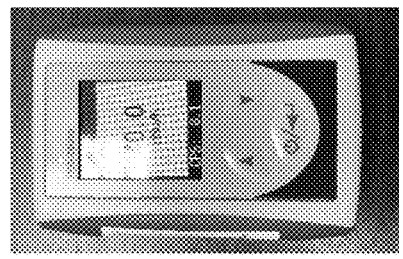
Figure 6C:
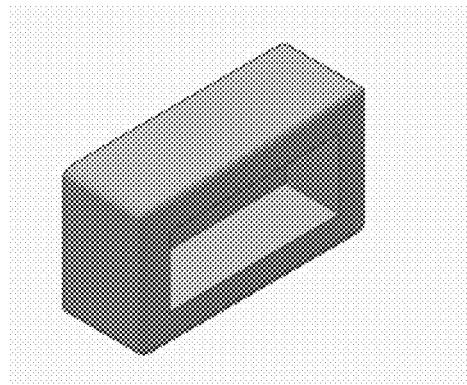
Figure 6D:
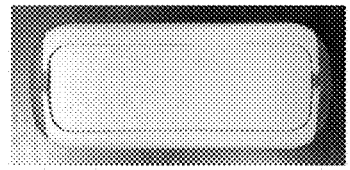

A sleeve was designed using CAD to fit over the distal end of a NaI scintillation detector. Using either of the 3D-printing processes of Example 3, a gadolinium-infused filament is used to print a sleeve. FIGS. 5A and 5B show two views of a CAD drawing of the sleeve. Dotted arrow lines indicate the directional application of the sleeve onto the distal end of scintillation detector, thus covering the window of the scintillation detector. The inner diameter of the round sleeve is 61 mm, and the outer diameter is 81 mm. The sleeve is 30 mm in height, and the depth of the sleeve is 20 mm. Thus, the sleeve side wall and end wall have a thickness of 10 mm all around the detector. When exposed to neutron radiation, the neutrons were absorbed in the sleeve material, and registered on the radiation detector as gamma radiation, with a total dose that was higher than the neutron dose.

Example 5

A covering was designed to fit over a Geiger counter radiation detection device and was 3D-printed using a gold-infused ABS filament, using either of the printing processes as described in Example 3. The inner dimensions were 63 mm×26 mm, and the outer dimensions were 83 mm×46 mm. The height of the covering was 30 mm, and the depth of the inner cavity was 20 mm. Each wall of the covering had a thickness of 10 mm. FIGS. 6A-6D show two views of a CAD drawing of the covering. The covering is shown in 6A and 6B, and the device is shown in 6C and 6D. When in use, the device is placed inside the covering so that the window for detection of radiation is covered. When exposed to neutron radiation, the neutrons were absorbed in the 3D-printed material, and registered on the radiation detector as gamma radiation, with a total dose that was higher than the neutron dose.

Example 6

Figure 7A:
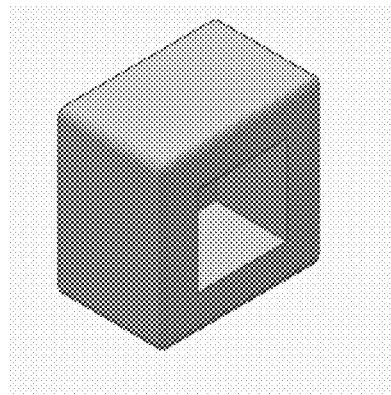
FIGS. 7A-7D illustrate an exemplary sleeve or covering for rectangular radiation detection device, including deployment of the sleeve to cover the window of the radiation detection device.
Figure 7B:
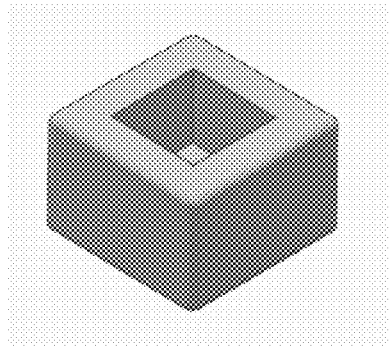
Figure 7C:
Figure 7D:
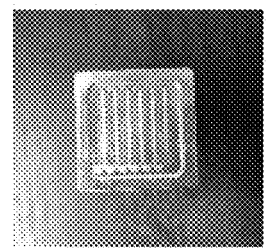
Figure 7E:
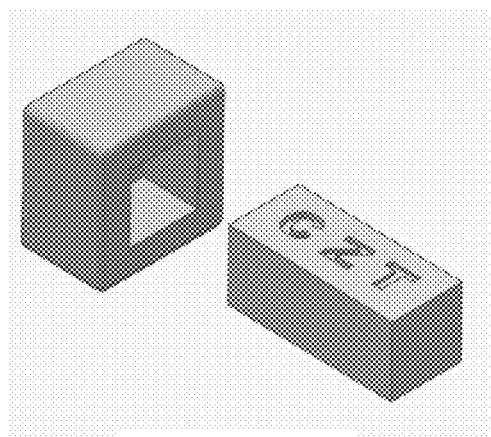
FIG. 7E shows a CAD drawing wherein the sleeve and radiation device (labeled as CZT) are uncoupled.
Figure 7F:
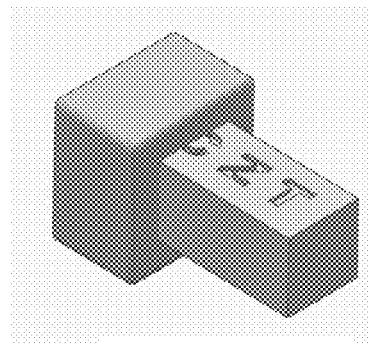
FIG. 7F shows a CAD drawing wherein the radiation detection device is coupled with the sleeve by inserting or sliding the device into the sleeve. Not drawn to scale.

Sleeves were designed and fabricated by 3D-printing with cadmium-infused ABS filaments or gadolinium-infused ABS filaments using the either of the printing processes described in Example 3. FIGS. 7A-7D illustrate the configuration of one of the sleeves for rectangular radiation detection device, which is a semiconductor detector made of cadmium zinc telluride (CZT)), including deployment of the sleeve to cover the window of the radiation detection device. FIGS. 7A and 7B show two views of CAD drawings of the sleeve. The inner dimensions of the cavity are 25.5 mm×25.5 mm, and the outer dimensions are 45.5×45.5 mm. The inner cavity is 20 mm deep, and the overall height is 30 mm. The depth of the cavity is 10 mm. FIG. 7C shows a top view of the radiation detection device and FIG. 7D shows an end view, comprising the window through which radiation enters when the device is in use. FIG. 7E shows a CAD drawing wherein the sleeve and radiation device (labeled as CZT) are uncoupled. FIG. 7F shows a CAD drawing wherein the radiation detection device is coupled with the sleeve by inserting or sliding the device into the sleeve. When exposed to neutron radiation, the neutrons were absorbed in the 3D-printed material, and registered on the radiation detector as gamma radiation, with a total dose that was higher than the neutron dose.

Example 7

Using either of the methods of Example 3, an object is 3D-printed that is equivalent to a solid water phantom to use for calibration for boron neutron capture therapy (BNCT). The filament used for this application is a boron-infused ABS. The size and shape are configured to mimic the solid water phantom.

Example 8

The invention can be applied to standard gamma detectors as well as high Z high density detectors for higher detection efficiency and using them as thermal neutron detectors. An important application for the invention is for use as passive neutron detectors where a printed piece can be placed in a place of interest, such as check points at airports for catching neutron source smuggling, while placing a radiation detector at distance. The detector will detect the prompt gamma produced from the neutron interaction with the gadolinium while being safe away from the neutron source that could damage the detectors.

Thus, the Examples of the invention demonstrate the absorption, detection and discrimination provided by 3D printing with ABS filaments infused with various metal nanoparticles for a variety of thermal neutron applications. The applications can further involve related uses, including dosimetry and shielding properties. Additional modifications can be made for applications with fast neutrons.

While the invention has been described in terms of its several exemplary embodiments, those skilled in the art will recognize that the invention can be practiced with modification within the spirit and scope of the appended claims. Accordingly, the present invention should not be limited to the embodiments as described above but should further include all modifications and equivalents thereof within the spirit and scope of the description provided herein.

ACKNOWLEDGEMENTS

This project was funded by King Abdulaziz University, Jeddah, Saudi Arabia, and King Abdullah City for Atomic and Renewable Energy, Riyadh, Saudi Arabia, under grant number: KCR-KFL-10-20. Therefore, the authors gratefully acknowledge their technical and financial support.

We claim:

1. A filament comprising acrylonitrile butadiene styrene (ABS) and infused with at least one metal selected from the group consisting of gadolinium, boron, gold and cadmium, wherein the at least one metal is present in the ABS filament at a concentration in the range of 0.1 to 10 w/w.

2. The filament of claim 1, wherein the filament comprising ABS is infused with at least two metals and each of the at least two metals is present at a concentration in the range of 0.1 to 10 w/w.

3. A method of fabricating a 3D-printed material comprising:
   providing an acrylonitrile butadiene styrene (ABS) filament infused with at least one metal selected from the group consisting of gadolinium, boron, gold and cadmium, wherein the at least one metal is present in the ABS filament at a concentration in the range of 0.1 to 10 w/w,
   determining a desired shape or configuration to be produced; programming a 3D-printer to print the ABS filament in the desired shape or configuration, and
   printing the 3D-printed material in the desired shape or configuration.

4. The method of claim 3, wherein the desired shape or configuration is a sleeve or an overlay to be placed over a window on a gamma and/or alpha radiation detector.

5. The method of claim 3, wherein the desired shape or configuration is customized to uniquely fit over a desired surface of a gamma and/or alpha radiation detector.

6. A 3D-printed material, comprising an acrylonitrile butadiene styrene (ABS) filament infused with at least one metal selected from the group consisting of gadolinium, boron, gold and cadmium, wherein the at least one metal is present in the ABS filament at a concentration in the range of 0.1 to 10 w/w.

7. The 3D-printed material of claim 6, wherein the ABS filament is infused with at least two metals selected from the group consisting of gadolinium, boron, gold and cadmium.

8. The 3D-printed material of claim 6, wherein the ABS filament infused with at least one metal is configured to interact with neutrons of neutron radiation.

9. The 3D-printed material of claim 6, wherein the 3D-printed material is a sleeve, covering or overlay in a shape suitable for application on or over a gamma and/or alpha radiation detector.

10. The 3D-printed material of claim 6, wherein the 3D-printed material is configured to allow detection and discrimination of radionuclides in a mixed radiation field.

11. The 3D-printed material of claim 6, wherein the at least one metal is boron, and the desired shape or conformation is suitable for a water phantom-equivalent.

12. A method of detecting or measuring neutron radiation using a 3D-printed material to interact with neutron radiation and slow or thermalize neutron energy to a range that is detectable using device configured to detect gamma and/or alpha radiation, comprising the steps of:

fabricating the 3D-printed material in a shape or configuration appropriate for detecting neutron radiation, wherein the 3D-printed material comprises an acrylonitrile butadiene styrene (ABS) filament infused with at least one metal selected from the group consisting of gadolinium, boron, gold and cadmium and wherein the at least one metal is present in the ABS filament at a concentration in the range of 0.1 to 10 w/w, applying the 3D-printed material to a device configured for detecting gamma and/or alpha radiation, and operating the device according to a suitable protocol for detecting gamma and/or alpha radiation, wherein the energy of the neutron radiation is decreased and converted to gamma and/or alpha radiation.

13. The method of claim 12, wherein the at least one metal selected is suitable for discriminating and identifying radionuclides in a mixed radiation field, comprising the further steps of comparing total dose and neutron dose, and determining the dose from gamma and/or alpha radiation and the dose from neutron radiation.

* * * * *